(12) United States Patent
Peng et al.

(10) Patent No.: US 11,796,559 B2
(45) Date of Patent: Oct. 24, 2023

(54) DEVICE, SYSTEM AND METHOD FOR MONITORING RIVER FLOW VELOCITY BASED ON DIFFERENTIAL PRESSURE MEASUREMENT

(71) Applicant: CHINA INSTITUTE OF WATER RESOURCES AND HYDROPOWER RESEARCH, Beijing (CN)

(72) Inventors: Wenqi Peng, Beijing (CN); Yongsheng Zhang, Beijing (CN); Xiaobo Liu, Beijing (CN); Xuekai Chen, Beijing (CN); Weijie Wang, Beijing (CN); Fei Dong, Beijing (CN)

(73) Assignee: CHINA INSTITUTE OF WATER RESOURCES AND HYDROPOWER RESEARCH, Beijing (CN)

( * ) Notice: Subject to any disclaimer, the term of this patent is extended or adjusted under 35 U.S.C. 154(b) by 0 days.

(21) Appl. No.: 18/104,753

(22) Filed: Feb. 1, 2023

(65) Prior Publication Data
US 2023/0288443 A1 Sep. 14, 2023

(30) Foreign Application Priority Data

Mar. 8, 2022 (CN) .......................... 202210227748.X (51) Int. Cl.
*G01P 5/14* (2006.01)
*G01C 13/00* (2006.01)

(52) U.S. Cl.
CPC .............. *G01P 5/14* (2013.01); *G01C 13/006* (2013.01)

(58) Field of Classification Search
None
See application file for complete search history.

(56) References Cited

U.S. PATENT DOCUMENTS 4,809,547 A 3/1989 Warrow
5,597,952 A 1/1997 Struyk
(Continued)

FOREIGN PATENT DOCUMENTS

CN 101738186 A 6/2010
CN 104155473 A 11/2014
(Continued)

OTHER PUBLICATIONS

Search Report of the priority application CN202210227748.X.
(Continued)

*Primary Examiner* — Peter J Macchiarolo
*Assistant Examiner* — Jermaine L Jenkins
(74) *Attorney, Agent, or Firm* — J.C. PATENTS (57) ABSTRACT

The present invention relates to a device, a system and a method for monitoring river flow velocity based on differential pressure measurement, comprising: a hull floating on a water surface with an aspect ratio of the hull being greater than one, characterized in that pressure sensors are respectively provided on an upstream face of a front end and a downstream face of a rear end below the floatation line of a ship; an electronic instrument is provided in the hull, and the electronic instrument comprises an acquisition module connected to the two pressure sensors, the acquisition module being connected to a data processing module with a memory, and the data processing module being connected to a satellite positioning module and a wireless communication module. According to the present invention, the flow velocity of water flow is measured based on the difference between the simulated measured upstream face pressure at the bow and the simulated measured downstream face pressure at the stern by an unpowered measuring ship drifting on the water surface. The measured data is transmitted to the data processing center on the ground via the wireless communication (Continued)

network. The present invention enables the flow data to be measured in presence of poor satellite positioning signals and public network signals or no signals, achieving data transmission independent of satellite positioning and public communication networks.

11 Claims, 3 Drawing Sheets

(56) References Cited

U.S. PATENT DOCUMENTS

| | | | |
|---|---|---|---|
| 5,952,583 A | 9/1999 | Chang | |
| 6,308,581 B1 | 10/2001 | Deeds | |
| 9,580,150 B2 * | 2/2017 | Lee | B63B 49/00 |
| 10,018,648 B2 * | 7/2018 | Farokhi | G01F 1/46 |
| 10,495,500 B2 * | 12/2019 | Welle | G01F 1/002 |
| 2015/0377662 A1 | 12/2015 | Ray | |

FOREIGN PATENT DOCUMENTS

| | | |
|---|---|---|
| CN | 110406638 A | 11/2019 |
| DE | 3000825 A1 | 7/1981 |
| GB | 213878 A | 9/1924 |
| JP | H08170968 A | 7/1996 |
| JP | 2005003678 A | 1/2005 |
| JP | 2007093321 A | 4/2007 |
| JP | 2009103604 A | 5/2009 |
| JP | 2010025655 A | 2/2010 |
| WO | WO8706710 A1 | 11/1987 |
| WO | WO2011129029 A1 | 10/2011 |
| WO | WO2014027244 A2 | 2/2014 |

OTHER PUBLICATIONS

"Experiments to Verify the Relationship between Flow Velocity and Pressure", 卫生职业教育 (Vocational Education of Health Industry), vol. 27, No. 10, 2009, pp. 131-132.

* cited by examiner

DEVICE, SYSTEM AND METHOD FOR MONITORING RIVER FLOW VELOCITY BASED ON DIFFERENTIAL PRESSURE MEASUREMENT

CROSS-REFERENCE TO RELATED APPLICATION

This application claims the benefit of Chinese application No. 202210227748.X, filed on Mar. 8, 2022, the content of which is herein incorporated by reference in its entirety.

TECHNICAL FIELD

The present invention relates to a device, a system and a method for monitoring a river flow velocity based on differential pressure measurement. The present invention is a hydrological monitoring system and method, and a monitoring system and method that does not rely on a public wireless communication network for data transmission.

BACKGROUND ART

At present, the principle of determining water flow velocity is basically to determine a reference object firstly. For example, a relatively stationary object, such as a shore building or a tree, is taken as the reference object. The distance that the water flows in a unit time is measured to calculate the water flow velocity. Current water flow velocity monitoring methods include the buoying method, and various equipment and instrument monitoring method based on the Doppler principle. However, regardless of the method, it must be based on precise positioning. If it cannot be precisely positioned, it is impossible to determine the distance the water body has traveled. Due to the measured flow velocity, the positioning described herein must be very accurate engineering positioning. That is, very accurate centimeter-level engineering positioning data (typically, satellite positioning errors of more than one meter) is required in the case of satellite positioning. Ground markers are needed in the accurate engineering positioning. However, the upstream of rivers where the velocity needs to be monitored is often in remote areas of alpine and gorge regions. It is difficult to set the ground markers in those places with few people tread. In some special areas it is even impossible to set ground markers at all. In addition, the satellite positioning signals are often disturbed, so that normal measurements of river hydrological and water resources in the area cannot be made, or the measurement data are inaccurate. Another problem with river flow monitoring is how to transmit data measured by a measuring device floating in the water flow to the ground. It is now common practice to transmit data over public wireless communication networks. However, in many remote areas, there are no commonly established wireless communication base stations, or a small number of wireless communication base stations, such that the data acquired by the flotation device cannot be transmitted to the data processing center. How to measure the hydrology and water resources of rivers in highlands, valleys and special areas without positioning signals or with unstable positioning signals and without public wireless communication base stations is a problem to be solved.

SUMMARY OF THE INVENTION

To overcome the problems of the prior art, the present invention proposes a device, a system and a method for monitoring river flow velocity based on differential pressure measurement. According to the monitoring system and method, the flow velocity is measured by a differential pressure measurement device that does not rely on accurate positioning. The location of the measurement is determined by low-precision satellite positioning. The measurement data is transmitted to the ground processing center by transmission mode, thus realizing the data transmission that does not depend on the public communication network.

The object of the invention is achieved in that a device for monitoring river flow velocity based on differential pressure measurement, comprising a hull floating on a water surface with an aspect ratio of the hull being greater than one; pressure sensors are respectively provided on an upstream face of a front end and a downstream face of a rear end below the floatation line of a ship; an electronic instrument is provided in the hull, and the electronic instrument comprises an acquisition module connected to the two pressure sensors, the acquisition module being connected to a data processing module with a memory, and the data processing module being connected to a satellite positioning module and a wireless communication module; the data processing module is provided with a calculation unit capable of calculating a ship velocity according to the formula of:

$$\Delta V = V_{water} - V_{ship}$$

$$\Delta V = \sqrt{\frac{P_{upstream} - P_{downstream}}{C}}$$

$$V_{ship} = aV_{water} - b.$$

Further, the hull is pointed at a front end and flat at a back end.

Further, the hull is jujube pit-shaped with both ends pointed.

Further, the wireless communication module is a 4G or 5G mobile wireless communication module.

Further, the wireless communication module is an Internet of Things communication module.

Further, the communication protocol of the Internet of Things communication module is zigbee or POLT.

A system for monitoring river flow velocity based on differential pressure measurement by the above-mentioned monitoring device comprises a plurality of monitoring devices placed at a time difference from upstream of the river; each of the monitoring devices communicate in the placing order to form a wireless communication relay network; and the wireless communication relay network is connected to a data processing center located on the ground.

A method for monitoring river flow velocity based on differential pressure measurement by the above-mentioned system comprises the steps of:

step 1, calculating a measurement coefficient and constructing a relational expression: a simulated river flow channel is set up in a laboratory to simulate the flow condition of the measured river; the monitoring device is placed in the simulated river flow channel at various flow velocities to measure the flow velocity of the flow, the flow velocity of the device, the pressure on the upstream face and the pressure on the downstream face; the measurement coefficient C is calculated according to the formula:

$$C = \frac{(P'_{upstream} - P'_{downstream})}{(V'_{water} - V'_{ship})^2}$$

where $P'_{upstream}$ is the simulated measured upstream face pressure; $P'_{downstream}$ is the simulated measured downstream face pressure; $V'_{water}$ is the simulated measured water flow velocity; $V'_{ship}$ is the simulated measured device flow velocity;

the relational expression between water velocity and ship velocity is constructed by taking $V_{ship}$ as the ordinate and $V_{water}$ as the abscissa, substituting $V'_{water}$ and $V'_{ship}$, to construct the functional relationship curve between $V_{water}$ and $V_{ship}$ and then deduce the relational expression between $V_{water}$ and $V_{ship}$:

$$V_{ship} = aV_{water} - b;$$

where a, b are linear regression coefficients.

step 2, starting: establishing a base station at an upstream site of the river, starting a plurality of detection devices, and establishing a wireless communication network between each monitoring device and the data processing center;

step 3, placing: placing the monitoring devices in turn at certain time intervals, and determining the position of each monitoring device by satellite positioning;

step 4, pressure sampling: performing pressure sampling at a certain time interval, wherein $P_{upstream}$ is a pressure value measured by a sensor at the upstream face; $P_{downstream}$ is a pressure value measured by a sensor at the downstream face; simultaneously recording the satellite positioning position at a sampling point;

step 5, calculating flow velocity: calculating the flow velocity by the calculation unit according to the formula:

$$\Delta V = V_{water} - V_{ship}$$

$$\Delta V = \sqrt{\frac{P_{upstream} - P_{downstream}}{C}}$$

$$V_{ship} = aV_{water} - b;$$

step 6, transmitting: by means of relay transmission, transmitting by a first placed monitoring device the flow velocity data to a second placed monitoring device, and transmitting by the second placed monitoring device the flow velocity data to a third placed monitoring device until the data is transmitted to the data processing center on the ground;

step 7, recording and analyzing: collecting by the data processing center the flow velocity data transmitted by each monitoring device, determining the position of each flow velocity data in the river according to the positioning in each monitoring data, and the collection time to acquire the overall flow velocity data of the river.

Advantages and benefits of the present invention. According to the present invention, the flow velocity of water flow is measured based on the difference between the simulated measured upstream face pressure at the bow and the simulated measured downstream face pressure at the stern by an unpowered measuring ship drifting on the water surface. The measured data is transmitted to the data processing center on the ground via the wireless communication network. The present invention enables the flow data to be measured in presence of poor satellite positioning signals and public network signals or no signals, achieving data transmission independent of satellite positioning and public communication networks.

BRIEF DESCRIPTION OF THE DRAWINGS

The present invention will now be described in detail with reference to the accompanying drawings and embodiments.

DETAILED DESCRIPTION OF THE INVENTION

Embodiment I

Figure 1:
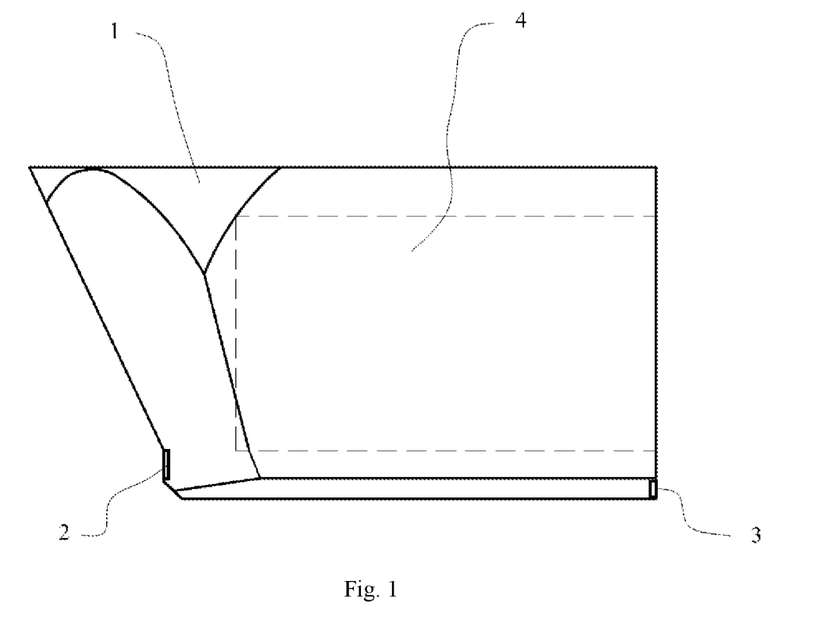
FIG. 1 is a schematic view showing a structure of a detection device according to Embodiment I of the present invention.
Figure 2:
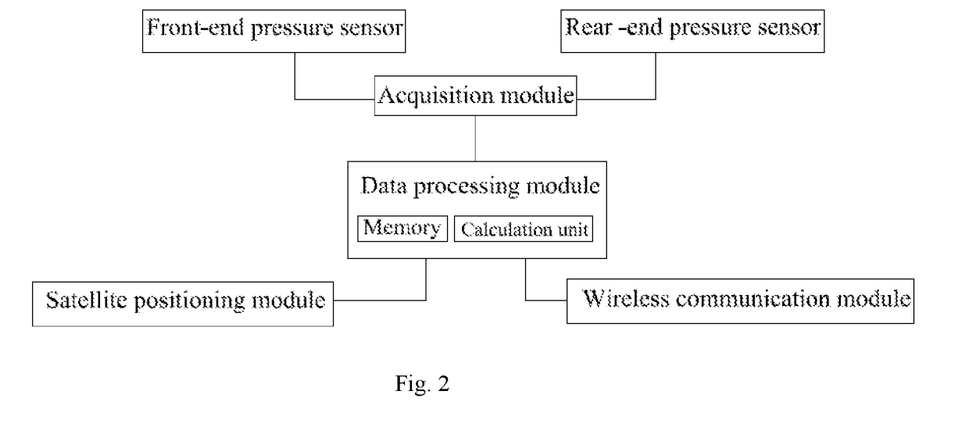
FIG. 2 is a schematic block diagram of a detection device according to Embodiment I of the present invention.

This embodiment is a device for monitoring river flow velocity based on differential pressure measurement, as shown in FIGS. 1 and 2. This embodiment comprises a hull 1 floating on a water surface with an aspect ratio of the hull being greater than one. Pressure sensors 2, 3 are respectively provided on an upstream face of a front end and a downstream face of a rear end below the floatation line of a ship. An electronic instrument 4 is provided in the hull, and the electronic instrument includes an acquisition module connected to the two pressure sensors. The acquisition module is connected to a data processing module with a memory. The data processing module is connected to a satellite positioning module and a wireless communication module. The data processing module is provided with a calculation unit capable of calculating a ship velocity according to the formula of:

$$\Delta V = V_{water} - V_{ship}$$

$$\Delta V = \sqrt{\frac{P_{upstream} - P_{downstream}}{C}}$$

$$V_{ship} = aV_{water} - b.$$

The main body of the device according to this embodiment is a small ship floating on the surface of the water. The lower half of the small ship is submerged in the water. The upper half is exposed out of the water surface. The bow and the stern of the boat submerged in the water are respectively provided with pressure sensors for measuring water pressure. In order to separate the bow and the stern, the shape of the hull of the small ship according to the present embodiment is an elongated object, i.e., the aspect ratio is larger than one, so that it is ensured that the length direction of the hull coincides with the direction of the water flow when the hull drifts in the water.

The shape of the hull may be a variety of shapes, such as a hull with a pointed bow and a straight stern, as shown in FIG. 1, or with the bow and stern both of pointed jujube core shape. To enable the hull to be more submerged in water, a ballast may be provided in the hull, which may be a rechargeable battery of greater capacity to provide sufficient power for the various equipment installed in the hull.

The pressure sensor shall be a high precision and sensitive sensor, with a type of pressure sensor adopted. The acquisition module employed in this embodiment may be a variety of similar data acquisition modules. Alternatively, a digital pressure sensor may be simply employed to transmit digital pressure signals to the data processing module directly.

The satellite positioning module may be a Beidou satellite positioning or a GPS satellite positioning module.

The wireless communication module may be a general communication module, namely, a mobile phone communication module using a public wireless communication network, and may be various communication network modules such as 2G, 3G, 4G and 5G, which are determined according to the local wireless communication environment of the monitored river.

In order to solve the problem that there is no wireless communication network in the local area, the wireless communication module can be an ad hoc network communication module of the existing Internet of Things, such as, communication modules (for example, WIFI, zigbee and POLT). Such wireless communication modules can transmit signals from several kilometers or even tens of kilometers back to the ground for data processing by means of relay.

The data processing module described in the present embodiment is an electronic instrument having storage and computing processing capabilities, such as, an industrial PC, a single chip microcomputer, MPU, SOC, etc. A calculation unit capable of calculating the ship velocity according to the following formula is provided therein, and the calculation unit can be software or a hardware chip specially designed according to the formula of $$\Delta V = V_{water} - V_{ship}$$
$$\Delta V = \sqrt{\frac{P_{upstream} - P_{downstream}}{C}}$$
$$V_{ship} = aV_{water} - b.$$

Embodiment II

Figure 3:
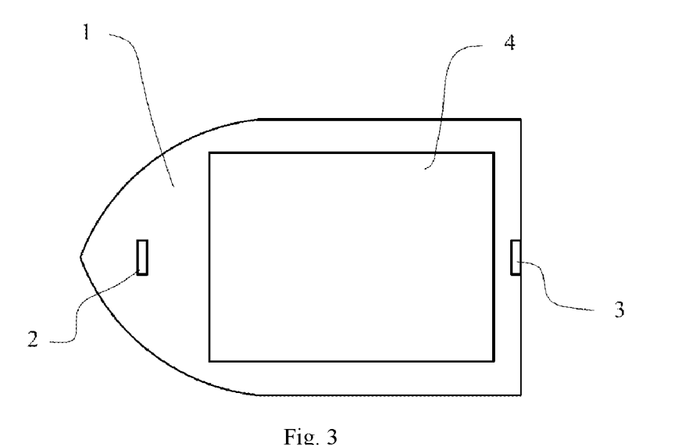
FIG. 3 is a schematic view showing a shape of a hull according to Embodiment II of the present invention.

This embodiment is an improvement of Embodiment I, and is a refinement of the hull according to Embodiment I. The hull of this embodiment is pointed at a front end and flat at a back end, as shown in FIG. 3.

The hull according to this embodiment is a relatively common type of ship, which is relatively easy to manufacture, especially with a relatively large cabin which can accommodate a relatively large amount of instruments. In addition, water sprayers may be provided around the ship so that the movement state of the ship can be changed by power, which can adjust the movement direction of the ship from drifting without power. Thus, the small ship can travel along a predetermined monitoring route.

Embodiment III

Figure 4:
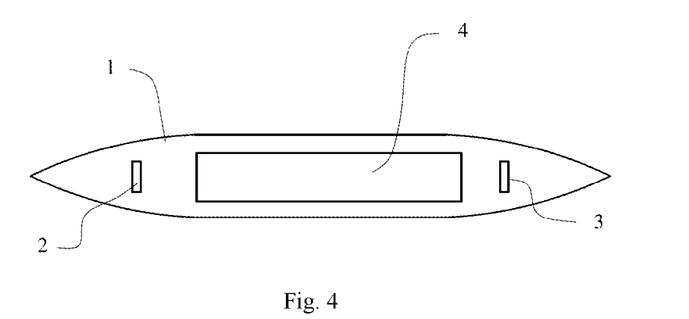
FIG. 4 is a schematic view showing the shape of a hull according to Embodiment III of the present invention.

This embodiment is an improvement of Embodiment 1, and is a refinement of the hull according to Embodiment I. The hull described in this embodiment is jujube pit-shaped with both ends pointed, as shown in FIG. 4.

The shape of the hull of this embodiment is a shape with less resistance in the flow of water and is arranged so as to reduce the turbulence created by the movement of the small ship in the body of water, disturbing the measurements.

Embodiment IV

This embodiment is an improvement of the above-mentioned embodiments and is a refinement of the above-mentioned embodiments for wireless communication modules. The wireless communication module described in this embodiment is a 4G or 5G mobile wireless communication module.

The 4G or 5G mobile wireless communication module is a communication module used by a public wireless communication network used for mobile phone cellular communication. This module communication generally requires a SIM card provided by a mobile phone operator, which is equivalent to a mobile phone, or a special data channel provided by the mobile phone operator. This kind of communication module is easy to link and provides strong signals usually. It is not easy to lose data. It has large power and more energy consumption. Depending on the public communication network, it is more suitable in some economically developed areas.

Embodiment V

This embodiment is an improvement of the above-mentioned embodiments and is a refinement of the above-mentioned embodiments for wireless communication modules. The wireless communication module described in the present embodiment is an Internet of Things communication module.

The Internet of Things communication module has a variety of communication protocols, with special hardware required. It does not rely on the public communication network, and can network itself. It has a high anti-interference ability, and can accurately carry out data transmission. If some special transmission and reception methods are applied in the transmission, it does not need to worry about losing data as long as a long-time off-network does not occur.

Common Internet of Things communication protocols that do not depend on the public communication network are Wifi, zigbee, plot, etc.

Embodiment VI

This embodiment is an improvement of embodiment 5 and is a refinement for the Internet of Things communication module of embodiment 5. The communication protocol of the Internet of Things communication module described in the present embodiment is zigbee or POLT.

Zigbee or POLT, two low-power, long-distance data transmission protocols, is a narrow-band simple data transmission protocol. These two protocols need to be equipped with special hardware facilities, completely independent of the public mobile communication network, and are especially suitable for remote areas where people are scarce.

Embodiment VII

Figure 5:
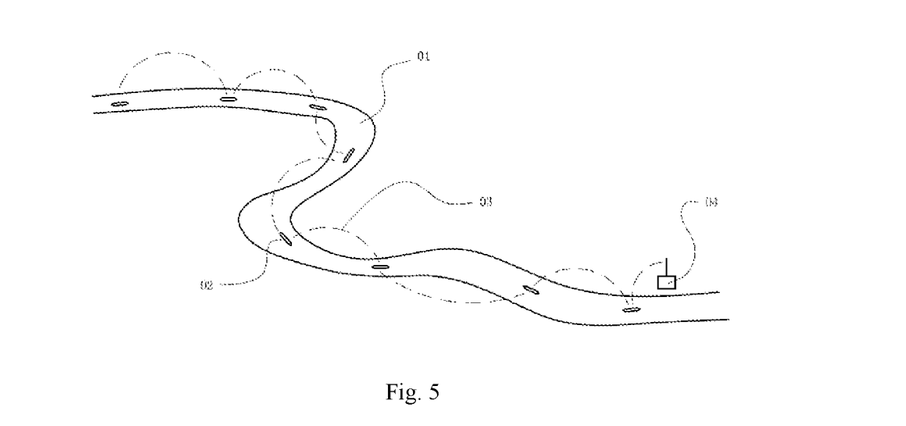
FIG. 5 is a schematic view of a system according to Embodiment VII of the present invention.

This embodiment is a system for monitoring river flow velocity based on differential pressure measurement by the monitoring device described in Embodiment VI, as shown in FIG. 5. The present embodiment includes a plurality of monitoring devices 02 placed at a time difference from upstream of the river 01. Each of the monitoring devices communicate in the placing order to form a wireless communication relay network 03. The wireless communication relay network is connected to a data processing center 04 located on the ground.

The system described in the present embodiment is a system for data transmission independent of a public communication network, and can transmit by the communication module thereof signals from a front end to a back end by means of relay and connect same to a data processing center on the ground.

The data processing center may be one or several servers with a memory for storing large amounts of data, e.g., a large memory such as an array of disks. The data processing center is usually installed with a digital map. At least the digital map of the river to be monitored should be available, so as to mark the accurate position sent by each small ship in the digital map. It is determines from the digital map that the small ship is at the position where the water flow velocity monitoring is needed, such as the center line position of the river. If there is no location where the flow velocity needs to be measured, the movement of the small ship can be altered manually by activating a sprinkler to reach the desired measurement location.

Embodiment VIII

This embodiment is a method for monitoring river flow velocity based on differential pressure measurement by the system described in Embodiment VII. The main process of the river flow velocity monitoring method is as follows. Firstly, the measurement coefficient is determined in a laboratory. The measurement coefficient is related to the shape of the small ship, so that detection and calculation can be performed in the laboratory. A base station for monitoring are then provided upstream the monitored river. A plurality of monitoring devices (small ships) are networked, and placed therefrom in the river after networking, so that the plurality of small ships drift downstream according to a certain interval. The water pressure parameter sampling are performed at a certain step length in the drift process, and the flow velocity is calculated. Then positioning is made by a satellite to determine sampling points. These data are relayed by the wireless communication network from downstream to upstream to reach the data processing center set on the ground. After processing by the data processing center, the flow velocity of the entire river can be obtained. In this way, it is possible to obtain the river flow velocity distribution in the downstream area without reaching the downstream area.

Figure 6:
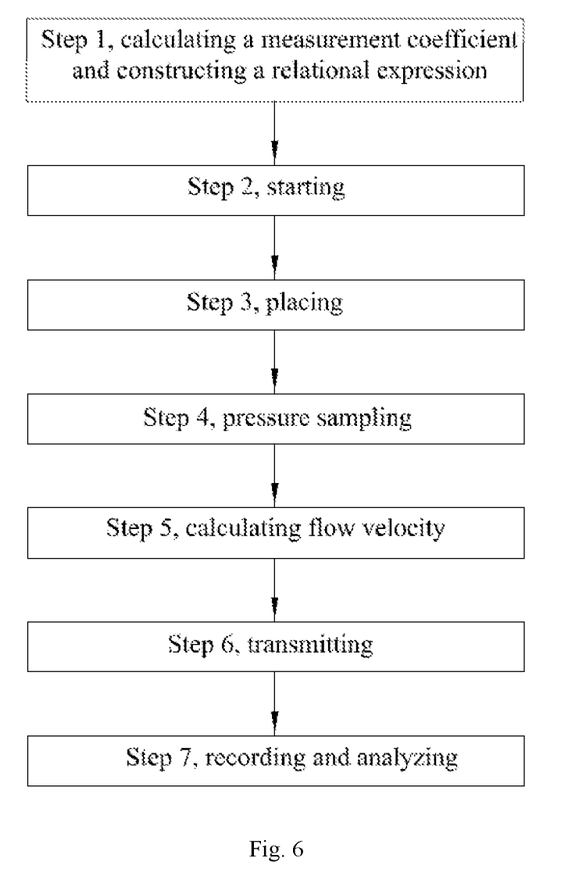
FIG. 6 is a flowchart of a method according to Embodiment VIII of the present invention.

The method described in this embodiment specifically includes the following steps, with the procedures as shown in FIG. 6.

step 1, calculating a measurement coefficient and constructing a relational expression: a simulated river flow channel is set up in a laboratory to simulate the flow condition of the measured river; the monitoring device is placed in the simulated river flow channel at various flow velocities to measure the flow velocity of the flow, the flow velocity of the device, the pressure on the upstream face and the pressure on the downstream face; the measurement coefficient C is calculated according to the formula:

$$C = \frac{(P'_{upstream} - P'_{downstream})}{(V'_{water} - V'_{ship})^2}$$

where $P'_{upstream}$ is the simulated measured upstream face pressure; $P'_{downstream}$ is the simulated measured downstream face pressure; $V'_{water}$ is the simulated measured water flow velocity; $V'_{ship}$ is the simulated measured device flow velocity; The term with "'" refers to the measurement parameter calculated during the simulation experiment.

First, a simulation channel similar to the measured river is built in the laboratory to simulate the real river channel, including flow velocity, various flow velocity and flow conditions of water flow. The theoretical basis for the use of a simulated flow channel is that the use of pressure for flow velocity measurement is mainly related to the shape of the small ship (monitoring device) and is not much related to the flow channel. The measurement of the critical measurement coefficient C can thus be performed using an analogue flow channel.

Derivation of Formula

1. When the ship is in a uniform velocity state, the force of the ship is balanced:

$$P_{downstream}A_{resistance} + F_{friction} - P_{upstream}A_{resistance} = 0$$

$$F_{friction} = \tau_{friction}A_{friction}$$

where $A_{resistance}$ is the water resistance projected area of the ship in the direction perpendicular to the flow velocity; $A_{friction}$ is the friction area of the ship with water in the direction of flow velocity; $\tau_{friction}$ is the shear stress in the direction of water flow.

2. According to the shear stress formula of fluid on boundary, $$\tau_{friction} = \frac{1}{2}f\rho\Delta V^2$$

by taking the ship as the reference system, the flow velocity of water relative to the ship is $$\Delta V = V_{water} - V_{ship}$$

where f is the resistance coefficient; and f is an undetermined constant when the water is in a turbulent state.

$$P_{downstream} - P_{upstream} + \frac{1}{2}\frac{A_{friction}}{A_{resistance}}f\rho\Delta V^2 = 0$$

Let $C = \frac{1}{2}\frac{A_{friction}}{A_{resistance}}f\rho$, then $$C = \frac{(P_{upstream} - P_{downstream})}{(V_{water} - V_{ship})^2}$$

where C is the measurement coefficient.

Secondly, the relational expression between water velocity and ship velocity is constructed by taking $V_{ship}$ as the ordinate and $V_{water}$ as the abscissa, substituting $V'_{water}$ and $V'_{ship}$, to construct the functional relationship curve between $V_{water}$ and $V_{ship}$ and then deduce the relational expression between $V_{water}$ and $V_{ship}$:

$$V_{ship} = aV_{water} - b;$$

where a, b are linear regression coefficients.

Figure 7:
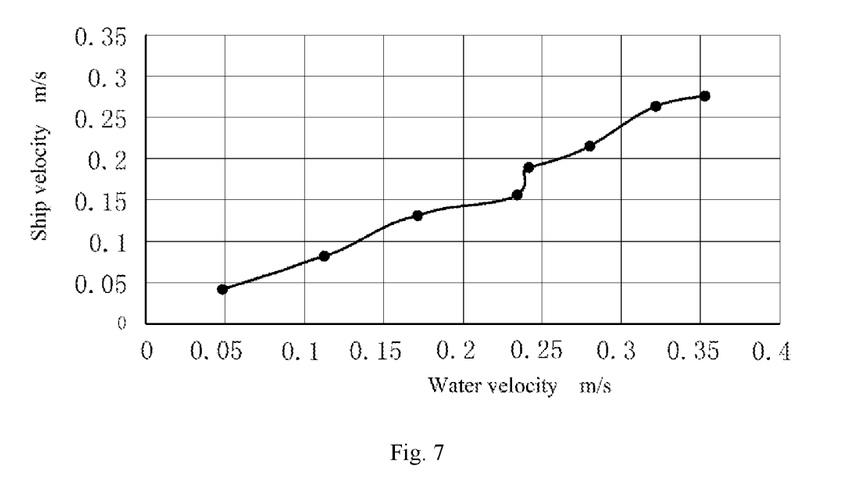
FIG. 7 is a graph showing the curve of water velocity as a function of ship velocity for the ship type of FIG. 1 according to Embodiment VIII of the present invention.

As shown in FIG. 7, the curve of water velocity as a function of ship velocity for the ship type of FIG. 1 is obtained by the linear regression.

$$V_{ship} = 0.7811 \cdot V_{water} - 0.0047.$$

Step 2, starting: establishing a base station at an upstream site of the river, starting a plurality of detection devices, and establishing a wireless communication network between each monitoring device and the data processing center.

Networking may be performed prior to launching a small ship in order to test the strength of the signal and to achieve timeliness in data transmission. The small ships are usually numbered in the order of placement in water, so that the identity of the small ship can be determined by the numbering for accurate measurement purposes.

Step 3, placing: placing the monitoring devices in turn at certain time intervals, and determining the position of each monitoring device by satellite positioning.

The placement usually requires a certain time interval, which mainly depends on the flow velocity of the river when the small ship is launched. The faster the flow velocity is, the shorter the time interval of launching the boat is, and vice versa. The distance between the two small ships should be maintained at a few hundred meters. If too far, it will lose contact. If too close, it will require more small ships and increase costs.

Step 4, pressure sampling: performing pressure sampling at a certain time interval, wherein $P_{upstream}$ is a pressure value measured by a sensor at the upstream face; $P_{downstream}$ is a pressure value measured by a sensor at the downstream face; simultaneously recording the satellite positioning position at a sampling point.

The sampling time interval is usually based on the measurement requirements. The shorter the sampling time interval, the larger the amount of data, the more computing resources and the higher the cost. Thus, the sampling interval is typically set to take into account the accuracy of the data, as well as computational resources and costs.

For each sampling point, it is necessary to determine the position, namely, position each pressure sampling point by the method of satellite positioning so as to determine the position of the measured flow velocity data and mark same in the digital map.

Step 5, calculating flow velocity: calculating the flow velocity by the calculation unit according to the formula of:

$$\Delta V = V_{water} - V_{ship}$$

$$\Delta V = \sqrt{\frac{P_{upstream} - P_{downstream}}{C}}$$

$$V_{ship} = aV_{water} - b.$$

The calculation of the flow velocity makes it critical to this embodiment to use a measurement coefficient that enables the measurement and the current measured water pressure at the bow and stern, and to obtain the flow velocity of the water flow by calculation.

Step 6, transmitting: by means of relay transmission, transmitting by a first placed monitoring device the flow velocity data to a second placed monitoring device, and transmitting by the second placed monitoring device the flow velocity data to a third placed monitoring device until the data is transmitted to the data processing center on the ground.

Since the wireless communication protocols used in this embodiment are zigbee, plot and their corresponding hardware facilities, the wireless communication thereof does not rely on a public communication network at all, but transmits the collected data to the data processing center by means of relay transmission. Therefore, great attention should be paid to the link of the network. Once the network is disconnected, the position of the small ship should be quickly adjusted to be linked again, so as to avoid the long-time network disconnection.

Step 7, recording and analyzing: collecting by the data processing center the flow velocity data transmitted by each monitoring device, determining the position of each flow velocity data in the river according to the positioning in each monitoring data, and the collection time to acquire the overall flow velocity data of the river.

The data may be output by means of a digital map or by means of a list.

Finally, it should be noted that the above-mentioned embodiments illustrate rather than limit the invention. Although the invention is described in detail with reference to the better arrangement solution, those skilled in the art should understand that the technical solutions of the invention (such as the type of the small ship, the selection and installation of various instruments, the application of various formulas, the sequence of steps, etc.) may be modified or equivalently replaced without separating the spirit and scope of the technical solutions of the invention.

The invention claimed is:

1. A device for monitoring river flow velocity based on differential pressure measurement, comprising a hull floating on a water surface with an aspect ratio of the hull being greater than one, characterized in that at least two pressure sensors are respectively-provided on an upstream face of a front end and a downstream face of a rear end below a floatation line of a ship; an electronic instrument is provided in the hull, and the electronic instrument comprises an acquisition module connected to the at least two pressure sensors, the acquisition module being connected to a data processing module with a memory, and the data processing module being connected to a satellite positioning module and a wireless communication module; the data processing module is provided with a calculation unit capable of calculating a ship velocity according to a formula of:

$$\Delta V = V_{water} - V_{ship}$$

$$\Delta V = \sqrt{\frac{P_{upstream} - P_{downstream}}{C}}$$

where $\Delta V$ is the velocity of water relative to the ship with the ship as a reference system; $V_{water}$ is the water velocity; $V_{ship}$ is the ship velocity; $P_{upstream}$ is a pressure of the upstream face; $P_{downstream}$ is a pressure of the downstream face;

calculation of a measurement coefficient C: a simulated river flow channel is set up in a laboratory to simulate a flow condition of a river to be measured; a monitoring device is placed in the simulated river flow channel at various flow velocities to measure the flow velocity of the flow, a flow velocity of the monitoring device, the pressure on the upstream face and the pressure on the downstream face; the measurement coefficient C is calculated according to a formula:

$$C = \frac{(P'_{upstream} - P'_{downstream})}{(V'_{water} - V'_{ship})^2}$$

where $P'_{upstream}$ is a simulated measured upstream face pressure; $P'_{downstream}$ is a simulated measured downstream face pressure; $V'_{water}$ is a simulated measured water flow velocity; $V'_{ship}$ is a simulated measured monitoring device flow velocity;

a relational expression between water velocity and ship velocity is constructed by taking $V_{ship}$ as an ordinate and $V_{water}$ as an abscissa, substituting $V'_{water}$ and $V'_{ship}$, to construct a functional relation curve between $V_{water}$ and $V_{ship}$ and then deduce the relational expression between $V_{water}$ and $V_{ship}$:

$$V_{ship} = aV_{water} - b$$

where a, b are linear regression coefficients.

2. The device for monitoring river flow velocity based on differential pressure measurement according to claim 1, characterized in that the hull is pointed at a front end and flat at a back end.

3. The device for monitoring river flow velocity based on differential pressure measurement according to claim 2, characterized in that the wireless communication module is a 4G or 5G mobile wireless communication module.

4. The device for monitoring river flow velocity based on differential pressure measurement according to claim 2, characterized in that the wireless communication module is an Internet of Things communication module.

5. The device for monitoring river flow velocity based on differential pressure measurement according to claim 4, characterized in that a communication protocol of the Internet of Things communication module is zigbee or POLT.

6. A system for monitoring river flow velocity based on differential pressure measurements by the device for monitoring river flow velocity based on differential pressure measurement of claim 5, characterized by comprising a plurality of monitoring devices placed at a time difference from upstream of the river to be measured; the plurality of monitoring devices communicate in a placing order to form a wireless communication relay network; and the wireless communication relay network is connected to an ashore data processing center.

7. A method for monitoring river flow velocity based on differential pressure measurement by the system of claim 6, characterized in that the method comprises the steps of:

step 1, calculating the measurement coefficient C and constructing the relational expression: the simulated river flow channel is set up in the laboratory to simulate the flow condition of the measured river; the monitoring device is placed in the simulated river flow channel at various flow velocities to measure the flow velocity of the flow, the flow velocity of the monitoring device, the pressure on the upstream face and the pressure on the downstream face; the measurement coefficient C is calculated according to the formula:

$$\Delta V = V_{water} - V_{ship}$$

$$\Delta V = \sqrt{\frac{P_{upstream} - P_{downstream}}{C}}$$

$$V_{ship} = aV_{water} - b;$$

where $P'_{upstream}$ is the simulated measured upstream face pressure; $P'_{downstream}$ is the simulated measured downstream face pressure; $V'_{water}$ is the simulated measured water flow velocity; $V'_{ship}$ is the simulated measured monitoring device flow velocity;

the relational expression between water velocity and ship velocity is constructed by taking $V_{ship}$ as the ordinate and $V_{water}$ as the abscissa, substituting $V'_{water}$ and $V'_{ship}$, to construct the functional relationship curve between $V_{water}$ and $V_{ship}$ and then deduce the relational expression between $V_{water}$ and $V_{ship}$:

$$V_{ship} = aV_{water} - b$$

where a, b are linear regression coefficients;

step 2, starting: establishing a base station at an upstream site of the river, starting a plurality of detection devices, and establishing the wireless communication relay network between each monitoring device and the data processing center;

step 3, placing: placing the monitoring devices in turn at certain time intervals, and determining a position of each monitoring device by satellite positioning;

step 4, pressure sampling: performing pressure sampling at a certain time interval, wherein $P_{upstream}$ is a pressure value measured by the sensor on the upstream face; $P_{downstream}$ is a pressure value measured by the sensor on the downstream face; simultaneously recording a satellite positioning position at a sampling point;

step 5, calculating flow velocity: calculating the flow velocity by the calculation unit according to the formula:

$$\Delta V = V_{water} - V_{ship}$$

$$C = \frac{(P'_{upstream} - P'_{downstream})}{(V'_{water} - V'_{ship})^2}$$

step 6, transmitting: by means of relay transmission, transmitting by a first placed monitoring device the flow velocity data to a second placed monitoring device, and transmitting by the second placed monitoring device the flow velocity data to a third placed monitoring device until the data is transmitted to the ashore data processing center;

step 7, recording and analyzing: collecting by the data processing center the flow velocity data transmitted by each monitoring device, determining a position of each flow velocity data in the river according to the positioning in each monitoring data, and a collection time to acquire the overall flow velocity data of the river.

8. The device for monitoring river flow velocity based on differential pressure measurement according to claim 1, characterized in that the hull is jujube pit-shaped with both ends pointed.

9. The device for monitoring river flow velocity based on differential pressure measurement according to claim 8, characterized in that the wireless communication module is a 4G or 5G mobile wireless communication module.

10. The device for monitoring river flow velocity based on differential pressure measurement according to claim 8, characterized in that the wireless communication module is an Internet of Things communication module.

11. The device for monitoring river flow velocity based on differential pressure measurement according to claim 10, characterized in that a communication protocol of the Internet of Things communication module is zigbee or POLT.

\* \* \* \* \*